Figure 1:
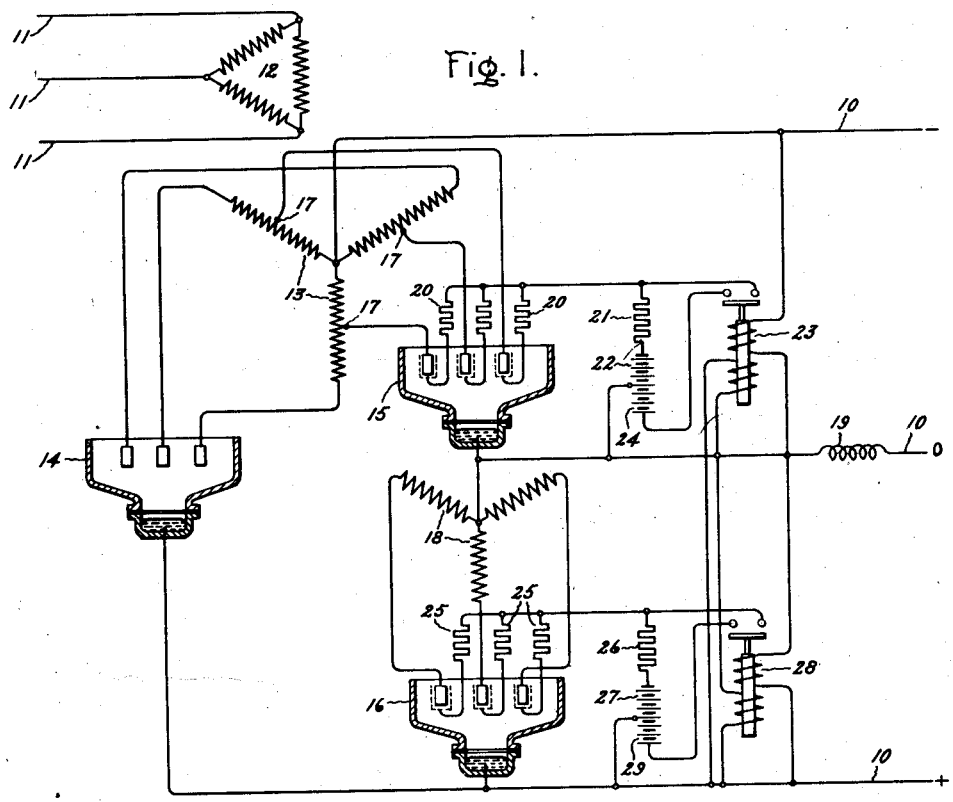

May 14, 1935.  H. HINTZE  2,001,532

SYSTEM OF ELECTRICAL DISTRIBUTION

Filed Sept. 5, 1933

Inventor:
Helmut Hintze,
by Harry E. Dunham
His Attorney.

Patented May 14, 1935

2,001,532

UNITED STATES PATENT OFFICE 2,001,532

SYSTEM OF ELECTRICAL DISTRIBUTION

Helmut Hintze, Kopenich-Wendenschloss, Germany, assignor to General Electric Company, a corporation of New York Application September 5, 1933, Serial No. 688,264
In Germany September 26, 1932

5 Claims. (Cl. 171—97)

My invention relates to systems of electrical distribution and more particularly to systems for supplying current to a three-wire Edison direct-current circuit.

When a three-wire Edison direct-current circuit is supplied from a rectifier or from a direct-current supply circuit without an electrical neutral, additional means must be provided for supplying any unbalance current drawn by the load circuit. It has heretofore been proposed to supply the auxiliary unbalance current by means of auxiliary rectifiers connected respectively between the outer terminals and the electrical neutral of the three-wire circuit. The operation of such auxiliary rectifiers in parallel with the main source of supply has not, however, been entirely satisfactory, particularly in the case when the three-wire circuit is supplied from a main rectifier. This is because of the fact that a mercury arc rectifier, due to its negative volt-ampere characteristics, will not ordinarily operate satisfactorily in parallel with another mercury arc rectifier, or another source of direct current, as for example, a dynamo-electric machine.

It is an object of my invention, therefore, to provide an improved system of electrical distribution for supplying a three-wire Edison direct-current circuit which will overcome the above-mentioned disadvantages of the arrangements of the prior art and which will be simple and reliable in operation.

It is another object of my invention to provide an improved system of electrical distribution for supplying a three-wire Edison direct-current circuit in which any unbalance current will be supplied by auxiliary rectifiers.

It is a further object of my invention to provide an improved system of electrical distribution for supplying a three-wire direct-current circuit in which the unbalance currents of the system are supplied by auxiliary rectifiers which are brought into operation only in response to an unbalance in the load circuit.

In accordance with my invention, a pair of auxiliary rectifiers are connected between the outer terminals and the neutral of a three-wire Edison direct-current circuit supplied from any suitable source of direct current, such as a main mercury arc rectifier, or a dynamo-electric machine. The auxiliary rectifiers are normally maintained non-conductive, as for example, by impressing negative potentials upon their control electrodes. A differential relay responsive to an electrical unbalance of the load circuit is effective to render conductive the proper one of the auxiliary rectifiers to supply current to that portion of the load circuit which is most heavily loaded. In accordance with another feature of my invention, the auxiliary rectifier apparatus is somewhat simplified by providing a single transformer network for both auxiliary rectifiers and connecting it with two groups of electric valves, each group being connected to one of the outer terminals of the three-wire system, the connections being those of an ordinary full-wave rectifier. The electrical neutral of the transformer network secondary is connected to the electrical neutral of the three-wire circuit. The two groups of valves may be selectively rendered conductive by any suitable means responsive to an unbalance in the load circuit, or the regulation characteristic of the auxiliary rectifying apparatus may be so related to that of the source of supply of the three-wire circuit that each auxiliary rectifying apparatus will come into operation only when the voltage of its associated half of the three-wire circuit drops below a predetermined value.

Figure 2:
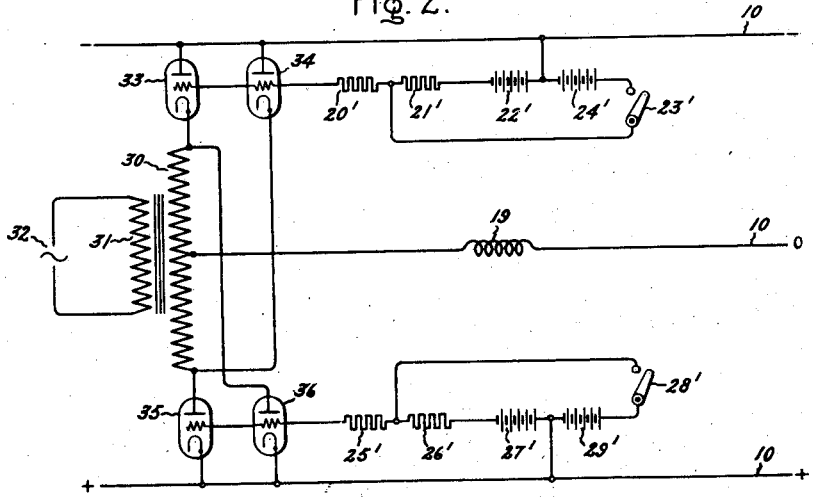

For a better understanding of my invention, together with other and further objects thereof, reference is had to the following description taken in connection with the accompanying drawing and its scope will be pointed out in the appended claims. Fig. 1 of the drawing diagrammatically illustrates an embodiment of my invention in which the auxiliary rectifying apparatus for supplying unbalance currents are energized from the power transformer which supplies the main rectifier connected to energize the three-wire circuit, while Fig. 2 shows a modified form of my invention in which both of the auxiliary rectifier apparatus operate from a single transformer network.

Referring now more particularly to Fig. 1 of the drawing, there is illustrated an arrangement for energizing a three-wire Edison direct-current load circuit 10 from a three-phase alternating-current supply circuit 11. This apparatus comprises a supply transformer provided with a primary network 12 connected to the supply circuit 11 and a star-connected secondary network 13, the electrical neutral of which is connected to the negative side of the direct-current circuit 10 and the phase terminals of which are connected to the anodes of a main mercury arc rectifier 14, the cathode of which is connected to the positive side of the direct-current circuit 10. There are also provided auxiliary mercury arc rectifiers 15 and 16 for supplying unbalance currents on the two halves of the direct-current load circuit 10. The auxiliary rectifier 15 may be energized from intermediate terminals 17 of the transformer secondary network 13, as illustrated, the cathode of the rectifier 15 being connected to the electrical neutral of the load circuit 10. The rectifier 16 may be supplied from a tertiary winding 18 of the main supply transformer, the electrical neutral of the network 18 being connected to the cathode of the rectifier 15 and to the neutral of the three-wire load circuit 10. The cathode of the rectifier 16 is connected to the cathode of the main rectifier 14 and to the positive side of the direct-current circuit 10. If desired, a smoothing reactor 19 may be included in the neutral of the load circuit, as illustrated.

In the circuit arrangement just described, where the main and auxiliary rectifiers are supplied from a common power transformer, it is usually difficult to so relate the regulation characteristics of the main and auxiliary rectifiers that the auxiliary rectifiers will satisfactorily operate to carry the unbalance currents of the load circuit. Their operation may be made more certain by providing them with control grids associated with their anodes. The grids of the rectifier 15 are connected to its cathode through current-limiting resistors 20, a resistor 21, and a negative bias battery 22. There is also provided a voltage differential relay 23 having operating windings connected between the neutral and each outer terminal of the direct-current load circuit 10. The contacts of the relay 23 are effective to connect the positive battery 24 in the circuit of the grids of the rectifier 15 to render it conductive. Similarly, the grids of the rectifier 16 are normally connected to its cathode through current-limiting resistors 25, a resistor 26, and a negative bias battery 27 while a voltage differential relay 28, provided with windings connected between the neutral and each outer terminal of the direct-current load circuit 10, is effective to connect a positive battery 29 in the circuit of the grids of the rectifier 16.

The general principles of operation of the above-described apparatus will be well understood by those skilled in the art. As long as the load circuit 10 is substantially balanced, the main rectifier 14 operates to supply unidirectional current to the outer terminals thereof in a well-known manner. Under these conditions, the relays 23 and 28 are deenergized and the negative bias batteries 22 and 27 maintain non-conductive their associated auxiliary rectifiers 15 and 16 respectively. In case the load on the circuit 10 between the electrical neutral and the negative side tends to increase over and above that between the neutral and the positive side, the voltage between the neutral and negative side will decrease relative to that between the neutral and the other side and the relay 23 will operate to close its contacts, thereby connecting the positive bias battery 24 in the circuit of the grids of the rectifier 15. This positive bias battery preferably is of a relatively high voltage to positively aid in the starting of the discharge of the main anodes of the rectifier 15. It is primarily because of this higher starting voltage of an arc rectifier that such devices will not ordinarily operate satisfactorily in parallel, for if one device begins to conduct current before the other, its voltage drop, and hence the voltage drop across the other device, is correspondingly reduced to the point where the other device will not start. By impressing a highly positive voltage on the grids of the mercury arc rectifier 15, however, its operation under the assumed conditions of unbalance is insured. Similarly, the auxiliary rectifier 16 operates to supply an unbalance current to its portion of the load circuit 10 when that portion is unsymmetrically loaded.

In the modification of my invention illustrated in Fig. 2 of the drawing, the auxiliary rectifier apparatus 15 and 16 and their associated secondary networks of the power transformer are replaced by a single secondary network 30 of a transformer, the primary winding 31 of which is connected to an alternating-current supply circuit 32, a pair of electric valves 33 and 34 interconnecting the terminals of the winding 30 and the negative side of the direct-current circuit 10, and a pair of electric valves 35 and 36 connecting the terminals of the winding 30 with the other side of the direct-current circuit 10. The winding 30 is also provided with an electrical neutral which is connected to the neutral of the load circuit 10, as illustrated. In this arrangement, the direct-current circuit 10 may be energized from any suitable source of direct current (not illustrated) such as the main rectifier apparatus 14 of Fig. 1, or from a separate dynamo-electric machine. The electric valves 33-36, inclusive, are each provided with an anode, a cathode, and a control electrode or grid, and may be of any of the several types well known in the art, although I prefer to use valves of the vapor electric discharge type. The grids of the groups of valves 33 and 34, and 35 and 36, are controlled through current-limiting resistors and bias batteries and relays responsive to an unbalance in the load circuit in a manner exactly similar to the auxiliary rectifiers 15 and 16 of Fig. 1, and these several circuit elements are indicated in Fig. 2 by the same numerals as the corresponding elements of Fig. 1, but primed to indicate their inclusion in a different circuit.

The operation of the system of Fig. 2 is similar to that of Fig. 1. So long as the load on the two portions of the three-wire direct-current circuit 10 is balanced, all of the electric valves 33-36, inclusive, are maintained non-conductive by their respective negative bias batteries. However, if the load on the direct-current circuit between the neutral and the negative line is increased above that between the neutral and the positive line, the contact 23' will be closed to render conductive electric valves 33 and 34 which operate with the secondary network 30 to supply uni-directional current to the upper half of the direct-current load circuit. Similarly, in the case of an unbalance in the opposite direction, the electric valves 35 and 36 cooperate with the network 30 to supply uni-directional current to the other half of the direct-current load circuit 10. As before, the initiation of the operation of the auxiliary rectifying apparatus is aided by the relatively high positive bias potentials impressed upon the grids of the valves when they are put into operation. In this arrangement, the auxiliary rectifiers are energized from a transformer network independent of the main source of supply and their regulation characteristics may more easily be related to that of the main source of supply so that, in certain cases, the grid control of the auxiliary rectifiers may be omitted.

While I have described what I at present consider the preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In a system of electrical distribution, a three-wire Edison direct-current load circuit, a source of direct current connected to the outer terminals of said load circuit, a source of alternating current, an auxiliary rectifier connected between each outer terminal and the neutral of said load circuit and energized from said source of alternating current, said auxiliary rectifiers being adapted to carry the unbalance current of said load circuit, and means responsive to an electrical unbalance of said load circuit for selectively rendering conductive said auxiliary rectifiers.

2. In a system of electrical distribution, a three-wire Edison direct-current load circuit, a source of direct current connected to the outer terminals of said load circuit, a source of alternating current, an auxiliary rectifier connected between each outer terminal and the neutral of said load circuit and energized from said source of alternating current, said auxiliary rectifiers being adapted to carry the unbalance current of said load circuit and being provided with control electrodes, means for normally exciting said control electrodes to maintain said auxiliary rectifiers non-conductive, and means responsive to an electrical unbalance of said load circuit for selectively exciting the control electrodes to render conductive one of said auxiliary rectifiers.

3. In a system of electrical distribution, a three-wire Edison direct-current load circuit, a source of direct current connected to the outer terminals of said load circuit, a source of alternating current, an auxiliary rectifier connected between each outer terminal and the neutral of said load circuit and energized from said source of alternating current, said auxiliary rectifiers being adapted to carry the unbalance current of said load circuit and being provided with control electrodes, means for normally impressing a negative potential upon said control electrodes to maintain said auxiliary rectifiers nonconductive, and a voltage differential relay responsive to the unbalance voltage of said load circuit for selectively impressing a positive potential upon the control electrodes of one of said rectifiers to render it conductive.

4. In a system of electrical distribution, a three-wire Edison direct-current load circuit, a source of direct current connected to the outer terminals of said load circuit, a source of alternating current, a transformer network energized from said source of alternating current and provided with an electrical midpoint connected to the neutral of said load circuit, two oppositely connected groups of electric valves interconnecting the several terminals of said transformer network and the outer terminals of said load circuit, and means responsive to an electrical unbalance of said load circuit for selectively rendering conductive one of said two oppositely connected groups of electric valves.

5. In a system of electrical distribution, a three-wire Edison direct-current load circuit, a source of direct current connected to the outer terminals of said load circuit, a source of alternating current, an auxiliary full-wave rectifier including a transformer network energized from said alternating current circuit and provided with an electrical midpoint connected to the neutral of said load circuit, a group of electric valves interconnecting the several terminals of said network with the positive side of said direct-current circuit, a group of valves interconnecting the several terminals of said network with the negative side of said load circuit, and means responsive to an electrical unbalance of said load circuit for selectively rendering conductive only one of said groups of valves.

HELMUT HINTZE.